Dec. 1, 1931.  P. A. HABERL  1,834,277
FLOATING LURE
Filed April 17, 1931
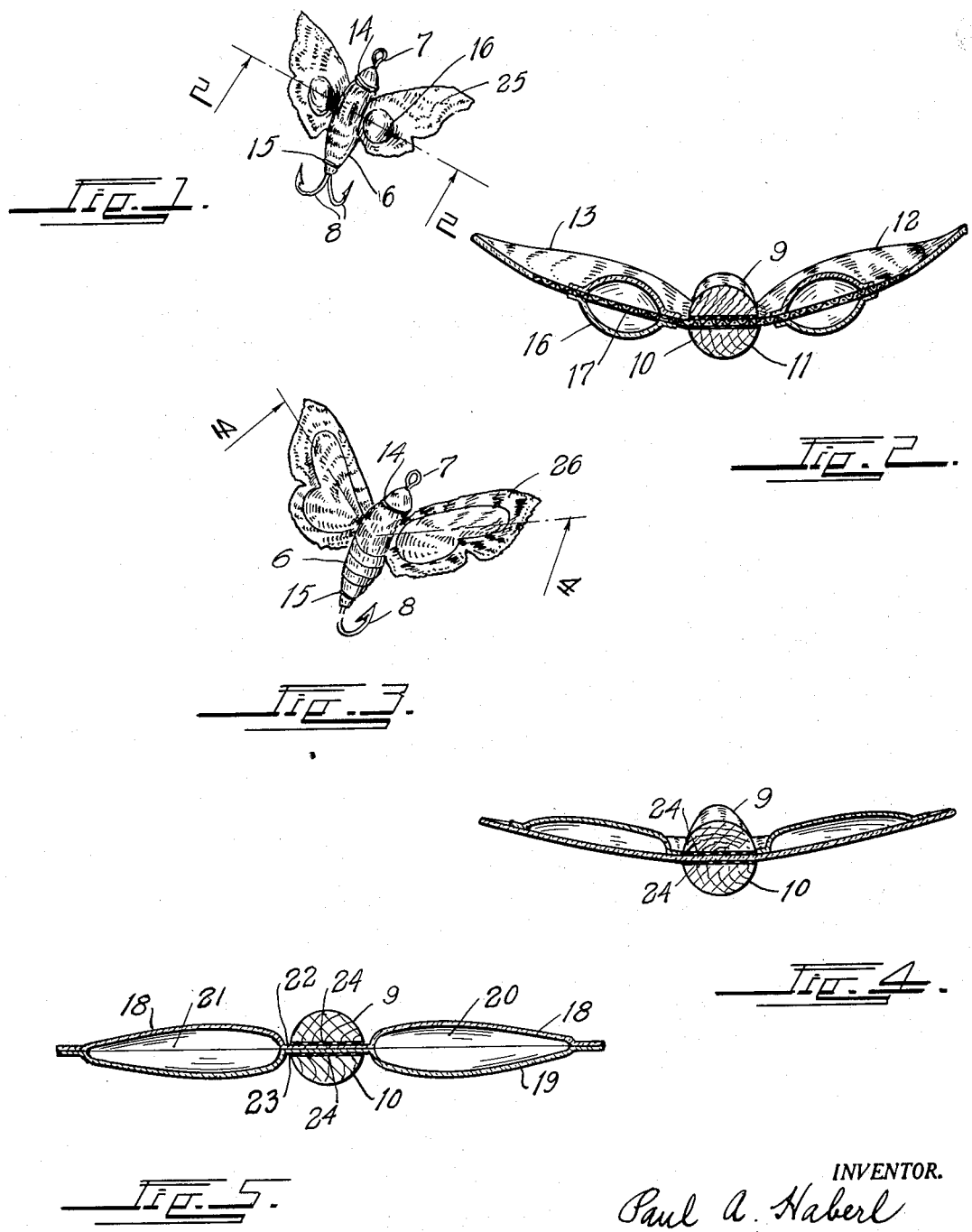
INVENTOR.
Paul A. Haberl
BY
Rollandet & Stratton
ATTORNEYS.

Patented Dec. 1, 1931

1,834,277

UNITED STATES PATENT OFFICE

PAUL A. HABERL, OF DENVER, COLORADO

FLOATING LURE

Application filed April 17, 1931. Serial No. 530,819.

My invention relates to floating lures. An object of the invention is to provide a buoyant lure, both sides of which simulate a winged insect, such as a moth, and the like, so that the lure will serve its purpose irrespective of which side is up.

Another object is to provide such a lure that will not lose its buoyancy by becoming water-soaked, as in the case of artificial trout flies now in use. I carry this object of my invention into practice by providing a sealed air chamber and/or by the use of buoyant material to cause the lure to float.

Still other objects are to provide a waterproof fabric or other material for the wings, and to provide a solid body to provide weight in casting.

A further object is to provide a lure of the character described that is buoyantly supported at either side of the body and thereby stabilized.

Other objects reside in details of construction and in novel combinations and arrangements of parts, which will appear in the course of the following description. In the drawings, like reference characters designate similar parts in the several views.

Figure 1 is a perspective view of a lure embodying features of the present invention.

Figure 2 is an enlarged section taken on the line 2—2 of Figure 1.

Figure 3 is a perspective view of a lure of modified construction, which also embodies features of my invention.

Figure 4 is an enlarged section taken on the line 4—4 of Figure 3.

Figure 5 is a section similar to that shown in Figure 4, but with a modified arrangement and construction of parts.

Referring more in detail to the drawings, the reference character 6 refers generally to the body of a lure. The body has a loop 7 at one end for fastening to a fish line and has hooks 8 at the opposite end for catching fish. The shanks of the loop and hooks may be embedded in the body in any suitable manner.

The body comprises halves or sections 9 and 10 which are glued at opposite sides of a neck portion 11 of wings 12 and 13. To assist further in holding the halves of the body in such position, the tips of the body are wound and tied by cord, as shown at 14 and 15, at either side of the neck portion.

The body is preferably of buoyant material, such as wood. The wings on opposite sides of the body carry air chambers or pockets 16 of celluloid or other waterproof material. The chambers, in the form shown in Figure 2, are mounted on opposite sides of the wings, by a suitable adhesive. A portion 17 of the wing separates the upper and lower pockets.

In Figures 1 and 2, the wings are made of fabric, such as silk, and covered with a waterproof filler, such as shellac. In the other forms, the entire wings may be made of celluloid. Figures 3 and 4 show the air chambers as being irregular in contour, following the outline of the wings, and being larger than those of Figures 1 and 2.

In Figure 5, the air pockets are made by complementary members 18 and 19. These members are fastened together at their edges by suitable adhesive or by fusion by heating same, and the spaces 20 and 21 therebetween provide the air pockets. In this form, each of the members has a neck portion, as shown at 22 and 23, which are respectively glued to sections 9 and 10 of the body by glue 24. The larger air pockets are suitable for larger lures.

It is to be understood that the several lures carry suitable markings on opposite sides of the bodies and wings, as shown at 25 and 26, so that the lure is equally effective, irrespective of which side is down. The sections of the body are tied together and the shanks of the loop and hook embedded therein, as described in connection with Figure 1.

Changes may be made in the details of construction and arrangement without departing from the spirit and scope of the invention.

The use of the present invention is thought apparent from the foregoing. The lure is fastened to a line by means of the loop 7. The body lends weight in casting and the air chamber provide stabilizing and buoyant means at either side of the body. The present lures are intended for what is called "nurse fishing" by fishermen, and are adapted especially for still water fishing. A fish is attracted by the lure, and in fighting and striking at the lure is caught by the hook or hooks thereon.

What I claim and desire to secure by Letters Patent is:

1. A fish lure comprising a buoyant body, and members simulating wings extending from the body, the wings being provided with air pockets at opposite sides of the body.

2. A fish lure comprising a body, members simulating wings extending from the body, and air pockets mounted on the wings.

3. A fish lure comprising a body, a hook held on the body, members on the body simulating wings, and air pockets on the wings at opposite sides of the body member.

4. A fish lure comprising a sectional body, and wings having a neck portion between sections of the body, the wings having air pockets.

5. A fish lure comprising a body, complementary wing members mounted on the body and extending outward therefrom, said members together forming an air pocket for the wings.

6. A fish lure comprising a sectional body, complementary wing members, each having a neck portion held between the sections of the body and said members together forming air pockets at either side of the body.

7. A fish lure comprising a body member, wings on the body member, and air pockets for the wings, the wings being marked at opposite sides in imitation of a natural object.

In testimony whereof I hereunto affix my signature.

PAUL A. HABERL.